(12) United States Patent
Furbeck (10) Patent No.: US 9,413,787 B2
(45) Date of Patent: Aug. 9, 2016

(54) REAL-TIME DELIVERY OF LOCATION/ORIENTATION DATA

(75) Inventor: David Stuart Furbeck, Keller, TX (US)

(73) Assignee: BlackBerry Limited, Waterloo, Ontario (CA)

(*) Notice: Subject to any disclaimer, the term of this patent is extended or adjusted under 35 U.S.C. 154(b) by 886 days.

(21) Appl. No.: 13/567,882

(22) Filed: Aug. 6, 2012

(65) Prior Publication Data

US 2014/0036048 A1 Feb. 6, 2014

(51) Int. Cl.
*H04L 29/06* (2006.01)
*H04W 4/02* (2009.01)
*H04W 4/20* (2009.01)

(52) U.S. Cl.
CPC ............ *H04L 65/1006* (2013.01); *H04L 65/40* (2013.01); *H04L 65/608* (2013.01); *H04W 4/02* (2013.01); *H04W 4/20* (2013.01)

(58) Field of Classification Search
None
See application file for complete search history.

(56) References Cited

U.S. PATENT DOCUMENTS

| | | | |
|---|---|---|---|
| 6,199,045 B1* | 3/2001 | Giniger et al. | 705/1.1 |
| 2003/0185245 A1* | 10/2003 | Kang et al. | 370/503 |
| 2006/0059245 A1* | 3/2006 | Toma et al. | 709/219 |
| 2007/0263575 A1* | 11/2007 | Choe | 370/338 |
| 2008/0192736 A1* | 8/2008 | Jabri et al. | 370/352 |
| 2008/0242312 A1 | 10/2008 | Paulson et al. | |
| 2008/0318593 A1 | 12/2008 | Cao et al. | |
| 2009/0052585 A1* | 2/2009 | Song et al. | 375/340 |
| 2009/0298512 A1 | 12/2009 | Chen et al. | |
| 2009/0318163 A1* | 12/2009 | George | 455/456.1 |
| 2010/0180039 A1 | 7/2010 | Oh et al. | |
| 2010/0195712 A1* | 8/2010 | Yu et al. | 375/240.01 |
| 2011/0044261 A1* | 2/2011 | Cai et al. | 370/329 |
| 2012/0009915 A1* | 1/2012 | Goel et al. | 455/422.1 |
| 2012/0071145 A1* | 3/2012 | Erhart et al. | 455/414.3 |
| 2012/0102209 A1* | 4/2012 | Fok Ah Chuen et al. | 709/228 |
| 2012/0113862 A1* | 5/2012 | Santhanam et al. | 370/254 |

FOREIGN PATENT DOCUMENTS

| | | |
|---|---|---|
| CN | 101243661 A | 8/2008 |
| CN | 101669328 A | 3/2010 |
| CN | 102177693 A | 9/2011 |
| WO | 2012005821 A1 | 1/2012 |

OTHER PUBLICATIONS

3GPP TS 26.114 V11.4.0; 3rd Generation Partnership Project; Technical Specification Group Services and System Aspects; IP Multimedia Subsystem (IMS); Multimedia Telephony; Media Handling and Interaction; Release 11; Jun. 2012; 263 pages.

Rosenberg, J., et al.; "SIP: Session Initiation Protocol"; RFC 3261; Jun. 2002; 252 pages.

(Continued)

*Primary Examiner* — Peling Shaw
(74) *Attorney, Agent, or Firm* — Conley Rose, P.C.; J. Robert Brown, Jr.

(57) ABSTRACT

A method is provided providing position information. The method comprises sending, by a first device to a second device, via a real-time transmission protocol, a message specifying at least one position-related parameter associated with the second device. The method further comprises receiving, by the first device from the second device, via the real-time transmission protocol, the at least one position-related parameter.

24 Claims, 9 Drawing Sheets

(56) References Cited

OTHER PUBLICATIONS

European Extended Search Report; Application No. 13179361.4; Nov. 14, 2013; 7 pages.
Camera & Imaging Products Association; "Exchangeable Image File Format for Digital Still Cameras: Exif Version 2.3"; CIPA DC-008 Translation-2010; Aug. 26, 2010; 190 pages.
3GPP TS 26.244 V11.0.0; 3rd Generation Partnership Project; Technical Specification Group Services and System Aspects; Transparent End-to-End Packet Switched Streaming Service (PSS); 3GPP File Format (3GP); Release 11; Jun. 2012; 58 pages.
Schulzrinne, H., et al.; "RTP: A Transport Protocol for Real-Time Applications"; RFC 3550; Jul. 2003; 98 pages.
Ott, J., et al.; "Extended RTP Profile for Real-Time Transport Control Protocol (RTCP)-Based Feedback (RTP/AVPF)"; RFC 4585; Jul. 2006; 51 pages.
Handley, M., et al.; "SDP: Session Description Protocol"; RFC 4566; Jul. 2006; 49 pages.
Furbeck, David Stuart, et al.; "Multimedia File Support for Media Capture Device Position and Location Timed Metadata"; U.S. Appl. No. 13/356,409, filed Jan. 23, 2012.
Canadian Office Action; Application No. 2,822,821; Jan. 29, 2015; 4 pages.
European Examination Report; Application No. 13179361.4; Mar. 13, 2015; 9 pages.
Canadian Office Action; U.S. Pat. No. 2,822,821; Nov. 13, 2015; 3 pages.
Chinese Office Action as Received in Co-pending Application No. 201310394655.7 on Feb. 3, 2016; 10 pages. (No English translation available).

\* cited by examiner

| 0 | | | | | | | | 410 | 420 | 430 | | | | | | | | | | | 2 | | | 440 | 450 | 460 | | | | | 3 | |
|---|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 1 | Reserved = 0 | | | | | | | 1 | 1 | 1 | 0 | 0 | 0 | 0 | 0 | 0 | 0 | Reserved = 0 | | | | | | 1 | 1 | 1 | 0 | 0 | 0 | 0 | 0 | 0 | 0 |
| <- LONGITUDE Frame 1 -> |||||||||||||||||||||||||||||||||
| <- LATITUDE Frame 1 -> |||||||||||||||||||||||||||||||||
| <- ALTITUDE Frame 1 -> |||||||||||||||||||||||||||||||||
| <- LONGITUDE Frame 2 -> |||||||||||||||||||||||||||||||||
| <- LATITUDE Frame 2 -> |||||||||||||||||||||||||||||||||
| <- ALTITUDE Frame 2 -> |||||||||||||||||||||||||||||||||

Figure 4

| 0 | | | | | | | | | 510 | 520 | | | | | | | | | | | 2 | | | 530 | 540 | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| 1 | Reserved = 0 | | | | | | | 1 | 1 | 1 | 1 | 0 | 1 | 1 | 1 | 0 | Reserved = 0 | | | | | | 1 | 1 | 1 | 1 | 0 | 1 | 1 | 1 | 1 |
| <- LONGITUDE Frame 1 -> |||||||||||||||||||||||||||||||||
| <- LATITUDE Frame 1 -> |||||||||||||||||||||||||||||||||
| <- ALTITUDE Frame 1 -> |||||||||||||||||||||||||||||||||
| <- PAN (magnetic) Frame 1 -> |||||||||||||||||||||||||||||||||
| <- ROTATION Frame 1 -> |||||||||||||||||||||||||||||||||
| <- TILT Frame 1 -> |||||||||||||||||||||||||||||||||
| <- OPTICAL ZOOM Frame 1 -> |||||||||||||||||||||||||||||||||
| <- DIGITAL ZOOM Frame 1 -> |||||||||||||||||||||||||||||||||
| <- LONGITUDE Frame 2 -> |||||||||||||||||||||||||||||||||
| <- LATITUDE Frame 2 -> |||||||||||||||||||||||||||||||||
| <- ALTITUDE Frame 2 -> |||||||||||||||||||||||||||||||||
| <- PAN (magnetic) Frame 2 -> |||||||||||||||||||||||||||||||||
| <- ROTATION Frame 2 -> |||||||||||||||||||||||||||||||||
| <- TILT Frame 2 -> |||||||||||||||||||||||||||||||||
| <- OPTICAL ZOOM Frame 2 -> |||||||||||||||||||||||||||||||||
| <- DIGITAL ZOOM Frame 2 -> |||||||||||||||||||||||||||||||||

| 0                               | 1                               | 2                               | 3           |
|---------------------------------|---------------------------------|---------------------------------|-------------|
| 0 1 2 3 4 5 6 7 8 | 9 0 1 2 3 4 5 | 6 7 8 9 0 1 2 3 4 5 6 7 8 9 0 1 |

| V=2 | P | 1 | CC | M | PT | Sequence Number |
|---|---|---|---|---|---|---|
| Timestamp ||||||||
| Synchronization Source (SSRC) Identifier ||||||||
| Contributing Source (CSRC) Identifiers (0 – 15 entries) ||||||||
| Profile-specific Information |||||| Length |
| ToC Entry |||||| Beginning of L0 Frame |

End of L0 Frame

| Start of Video RTP Payload |
|---|

Figure 8

| Profile-specific Information ||||||||||||||||| Length = 10 |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 1 | 0 | 0 | 0 || Rotation high word |
| Rotation low word ||||||||||||||||| Video payload start |

Figure 9

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| V=2 | | P | | Subtype | | | | | | PT = APP = 204 | | | | | | | | Length | | | | | | | | | | | | | |
| SSRC/CSRC | | | | | | | | | | | | | | | | | | | | | | | | | | | | | | | |
| Name (ASCII) | | | | | | | | | | | | | | | | | | | | | | | | | | | | | | | |
| 0 | 0 | 0 | 0 | 0 | 0 | 0 | 0 | 0 | 0 | 0 | 0 | 1 | 0 | 0 | 0 | Rotation high word | | | | | | | | | | | | | | | |
| Rotation low word | | | | | | | | | | | | | | | | Padding | | | | | | | | | | | | | | | |

REAL-TIME DELIVERY OF LOCATION/ORIENTATION DATA

BACKGROUND

Many smartphones, feature phones, tablets, digital cameras, and similar devices are equipped with a global positioning system (GPS) or other location sensing receivers, accelerometers, or digital compasses. Such components may sense the location and/or orientation of the devices in which they are installed. Such devices may also be equipped with cameras that can record coordinated video and audio information. The video and audio data may be tagged with location and orientation information provided by a location sensing component.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative examples of one or more implementations of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

U.S. patent application Ser. No. 13/356,409, filed Jan. 23, 2012 and entitled "Multimedia File Support for Media Capture Device Position and Location Timed Metadata" which is incorporated herein by reference for all purposes, addressed associating timestamps with position-related parameters and integrating support for the parameters into the International Organization for Standardization (ISO) base media file format or a file format based on the ISO base media file format such as a Third Generation Partnership Project (3GPP) or MPEG-4 (MP4) file. Such information could then be recorded in a video file so that it could be used either in processing the video or while displaying the video.

In embodiments of the present disclosure, the location and/or orientation information captured in such a manner is used in multimedia telephony or streaming. That is, real-time streaming may be used to send location and/or orientation (LO) information associated with a first device to a second device. The LO data may be used, for example, for establishing the location and/or orientation of devices involved in video calling or gaming, for displaying a map of the location of a device, for stabilizing an image received from an unstable device, or for other purposes. Location and/or orientation information may be referred to generically herein as position information.

Many types of devices, such as video cameras, camera phones, smart phones, personal digital assistants, tablet computers, and similar devices can record video and/or audio information. Some such devices might record only video information or only audio information, but the discussion herein will focus on devices that can record both video and audio. Any such apparatus that can record video and/or audio information will be referred to herein as a device. In some example embodiments described herein, the term "camera" may be used instead of the term "device". However, it is to be understood that the present disclosure applies more generically to devices.

A device might be able to tag recorded information with position data that could include a geographic location and/or a physical orientation. That is, a file containing video and/or audio information might be associated with metadata that describes the device's position at the time the file was created. The position information might be determined by a GPS system or a similar system.

Implementations of the present disclosure can associate timestamps with both location-related parameters and orientation-related parameters detected by a device. As discussed in detail below, location-related information might include latitude, longitude, and/or altitude, while orientation-related information might include pan, rotation, tilt and/or zoom. A plurality of samples of the location-related information and/or the orientation-related information can be recorded continuously throughout the creation of a video and/or audio recording, and the samples can be time stamped. Location-related and/or orientation-related information may be recorded as static information for the duration of a video and/or audio recording. The samples might be recorded in a metadata track that can be associated with the video and audio tracks.

Location-related information might include longitude, latitude, and/or altitude. Longitude might be a fixed-point 16.16 number indicating the longitude in degrees. Negative values might represent western longitude. Latitude might be a fixed-point 16.16 number indicating the latitude in degrees. Negative values might represent southern latitude. Altitude might be a fixed-point 16.16 number indicating the altitude in meters. The reference altitude, indicated by zero, might be set to sea level.

Figure 1:
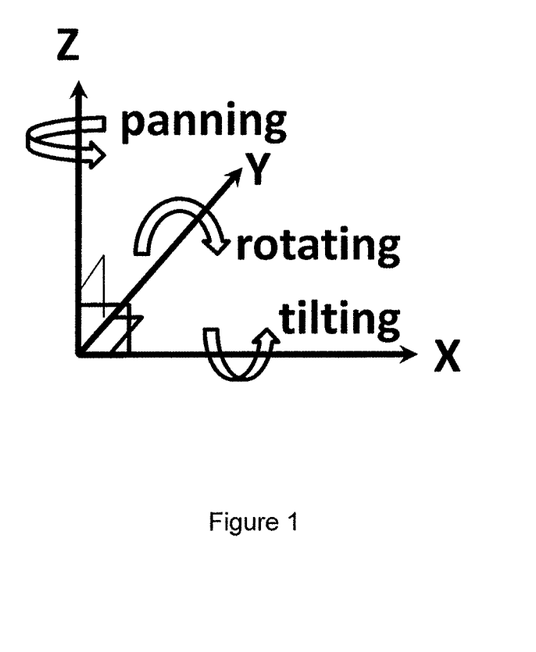
FIG. 1 illustrates the concepts of pan, tilt, and rotation.

The orientation of a device at a given location can be uniquely determined by its rotational position along three orthogonal axes. FIG. 1 illustrates the orientation-related parameters of Pan, Tilt, and Rotation for a device that is initially facing along the y-axis. In certain cases only a subset of these parameters may be relevant. For example, a Rotation parameter value may or may not be relevant for a directional microphone. In the figure, the x-y plane is parallel to the Earth's surface and the z-axis is perpendicular to the Earth's surface at the camera location (i.e., the positive z direction points towards the sky). Any vector pointing in the direction that the camera is facing will have a component vector in the x-y plane and another along the z-axis. The only exception to there being a component in the x-y plane is the case where the camera is pointing either straight down at the ground or straight up towards the sky. In this exceptional case, the Pan value is undefined and does not need to be included in the orientation parameters. Assuming that the component vector in the x-y plane does exist, its direction defines the positive y-axis. In other words, the compass direction component of any vector pointing in the direction that the camera is facing is the direction of the positive y-axis.

The Pan value can be defined as the amount of counter-clockwise (or alternatively clockwise) rotation about the z-axis needed to bring a vector initially pointing towards a fixed reference direction in the x-y plane (for example East) into alignment with the y-axis. That is, Pan might be a fixed-point 16.16 number measured in degrees and corresponding to the compass direction of the component in the plane parallel to the earth's surface of any vector which points in the same direction that the camera is facing. North might correspond to 0 degrees, East might correspond to 90 degrees, etc. If the camera is pointing in a direction perpendicular to the earth's surface (either straight up at the sky or straight down at the ground), then the value of Pan is undefined.

It may be useful for an application to know whether the direction for Pan is the "true" direction or the magnetic direction. The "true" direction of North is the direction of the Geographic North Pole, while the magnetic direction is the direction that a compass needle would point. The difference is caused in part by the different locations of the Magnetic North Pole and the Geographic North Pole and in part by things such as local iron deposits.

The Tilt value corresponds to the rotational position of the camera about the x-axis (the x-axis being defined as shown perpendicular to the y-axis and the z-axis). That is, Tilt might be a fixed-point 16.16 number measured in degrees corresponding to the rotational position about the axis in the plane of constant amplitude through the camera center that is perpendicular to the Pan direction. If the camera is pointing parallel to the earth's surface, Tilt is 0. If the camera is pointing straight up towards the sky, the Tilt is 90 degrees and if the camera is pointing straight down towards the earth the Tilt is −90 degrees.

The Rotation value corresponds to the camera's rotational position about the axis in the direction that the camera is facing. That is, Rotation might be a fixed-point 16.16 number measured in degrees corresponding to the rotational position about the y-axis. Since Tilt and Rotation are independent parameters, Rotation is defined for a Tilt value of 0. That is, the camera is first tilted to be pointing parallel to the earth's surface in the direction that would correspond to Pan. Rotation is then the amount of counter-clockwise rotation about the axis that the camera is facing needed to bring a vector initially pointing straight up towards the sky into alignment with the camera "up" direction. In the event that Pan is undefined as the camera is either pointing straight up or straight down, Rotation can be defined as the amount of rotation needed to bring a vector initially pointing North into alignment with the camera "up" direction.

As well as the parameters defined above, one or more Zoom parameters might also be defined, indicating the amount of optical zoom and/or digital zoom associated with images from the camera. Optical zoom might be a fixed point 16.16 number indicating the optical magnification scale factor. Digital zoom might be a fixed point 16.16 number indicating the enlargement scale factor of an image due to cropping and interpolating the pixel dimensions back to the original size. There might also be a horizontal and/or vertical component to the zoom that indicates a horizontal and/or vertical position within the image to center the zoom. The zoom might also be centered on a GPS location in the image. The zoom might by default apply to the whole image, but might apply to part of the image. One of ordinary skill in the art will recognize that there are numerous possible realizations of the Zoom parameters.

Embodiments of the present disclosure provide systems and methods for delivering location and/or orientation (LO) data in real time within a multimedia session. The session may be a multimedia telephony session or a streaming session, for example. The embodiments are flexible in allowing all of the specified data or any subset to be included in the delivery.

More specifically, at least three implementations are provided for real-time delivery of LO data in a multimedia session. In a first implementation, LO data is included in a Real-Time Transport Protocol (RTP) stream separate from the existing audio and video streams. In a second implementation, LO data is included in an RTP header extension of an existing audio or video stream. In a third implementation, LO data is included in an RTP Control Protocol (RTCP) App packet. Details of each of these three implementations will be provided in turn. In any of these implementations, a capability may be provided for a device to specify the elements of LO data that the device wishes to receive from another device. RTP is defined in Internet Engineering Task Force (IETF) Request for Comments (RFC) 3550, which is incorporated herein by reference.

In the first implementation, the LO data is transmitted in a separate RTP stream from the audio and video streams. Because the LO parameters can be independent of the audio and video encoding, having those parameters in a separate stream has the advantage that they can easily be negotiated separately from audio and video, and the stream can be enabled or disabled separately.

Figure 2:
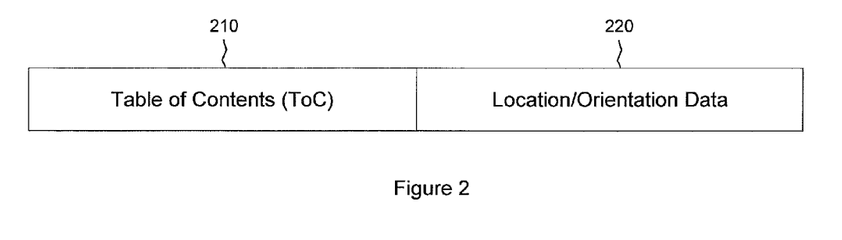
FIG. 2 illustrates the structure of a Real-Time Transport Protocol (RTP) payload, according to an implementation of the disclosure.

In order to perform RTP streaming of an LO metadata track or to otherwise deliver LO data in real time within a multimedia session, an RTP payload format may first be defined. In an embodiment, the basic structure of an RTP payload can be defined as shown in FIG. 2 and can include a table of contents 210 and LO data 220.

Figure 3:
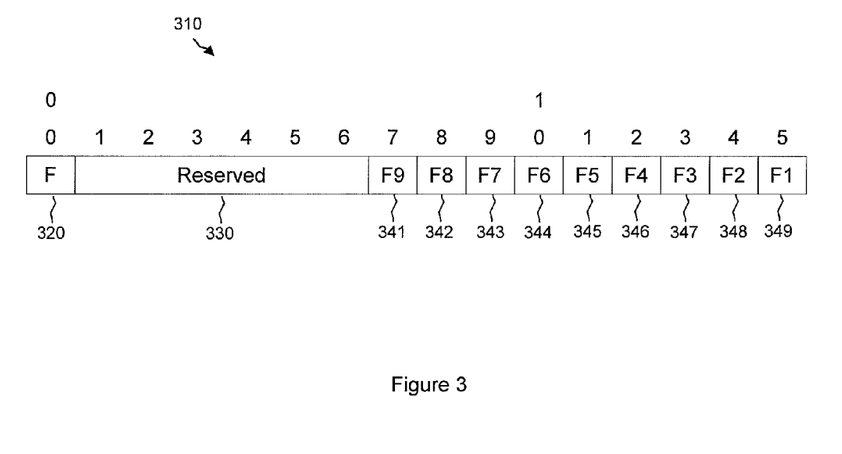
FIG. 3 illustrates a table of contents entry in an RTP payload, according to an implementation of the disclosure.

The table of contents (ToC) 210 comprises one or more ToC entries, each of which corresponds to an LO "frame". A ToC entry provides information regarding the contents of the corresponding LO frame. FIG. 3 illustrates an embodiment of a ToC entry 310, which in this case has the form of a two-byte field. The bits in FIG. 3 may be defined as follows:

F (1 bit): If set to 1, the F bit 320 indicates that the LO frame to which this ToC entry corresponds is followed by another LO frame in this payload. If set to 0, the F bit 320 indicates that the corresponding LO frame is the last frame in this payload.

Six bits (bits 1-6) 330 are reserved for future use.

F9 (1 bit): Longitude-present flag. If set to 1, the F9 bit 341 indicates that the LO frame contains Longitude. If set to 0, the F9 bit 341 indicates that Longitude is not present.

F8 (1 bit): Latitude-present flag. If set to 1, the F8 bit 342 indicates that the LO frame contains Latitude. If set to 0, the F8 342 bit indicates that Latitude is not present.

F7 (1 bit): Altitude-present flag. If set to 1, the F7 bit 343 indicates that the LO frame contains Altitude. If set to 0, the F7 bit 343 indicates that Altitude is not present.

F6 (1 bit): Pan-present flag. If set to 1, the F6 bit 344 indicates that the LO frame contains Pan. If set to 0, the F6 bit 344 indicates that Pan is not present.

F5 (1 bit): "Pan direction is true" flag. If set to 1, the F5 345 bit indicates that the direction indicated by Pan is the "true" direction as described above. If the Pan direction is magnetic or if Pan is not present, then F5 345 is set to zero. Alternatively, separate parameters, such as PanTrue and PanMagnetic, might be defined for the two types of pan direction.

F4 (1 bit): Rotation-present flag. If set to 1, the F4 346 bit indicates that the LO frame contains Rotation. If set to 0, the F4 bit 346 indicates that Rotation is not present.

F3 (1 bit): Tilt-present flag. If set to 1, the F3 bit 347 indicates that the LO frame contains Tilt. If set to 0, the F3 bit 347 indicates that Tilt is not present.

F2 (1 bit): OpticalZoom-present flag. If set to 1, the F2 348 bit indicates that the LO frame contains OpticalZoom. If set to 0, the F2 bit 348 indicates that OpticalZoom is not present.

F1 (1 bit): DigitalZoom-present flag. If set to 1, the F1 bit 349 indicates that the LO frame contains DigitalZoom. If set to 0, the F1 bit 349 indicates that DigitalZoom is not present.

One of ordinary skill in the art will appreciate that there are numerous ways to represent essentially equivalent information. Different subsets or supersets of these parameters may be defined, different ordering may be used, and/or different bit precisions may be used. An LO payload may also include parameters not defined here, for example magnetic variation (the difference between true and magnetic direction).

Each LO frame includes zero or one instance of each LO parameter according to whether or not the corresponding flag is set in the ToC entry. The parameters occur in the payload in an order determined by the order of their corresponding flags in the ToC entry (for example the same order).

Figure 4:
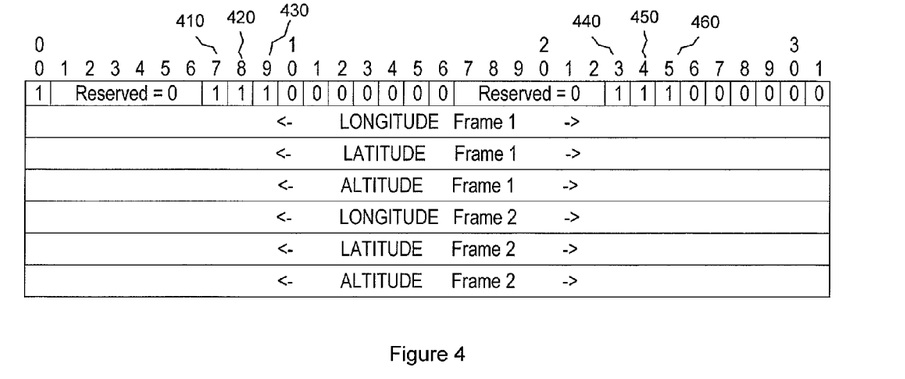
FIG. 4 illustrates an example RTP location/orientation payload, according to an implementation of the disclosure.

An example RTP LO payload containing two LO frames is shown in FIG. 4. In this example, only the location parameters of longitude, latitude, and altitude are included in the LO frame. That is, bits 410, 420, and 430 in the first ToC entry and bits 440, 450, and 460 in the second ToC entry are set to "1" and the remainder of the bits in each ToC entry are set to "0". Since the bits that are set to "1" correspond to F9 341, F8 342, and F7 343 as defined above, and since those bits correspond in turn to Longitude, Latitude, and Altitude, only Longitude, Latitude, and Altitude data elements are included in the data portion of the LO payload in FIG. 4.

Figure 5:
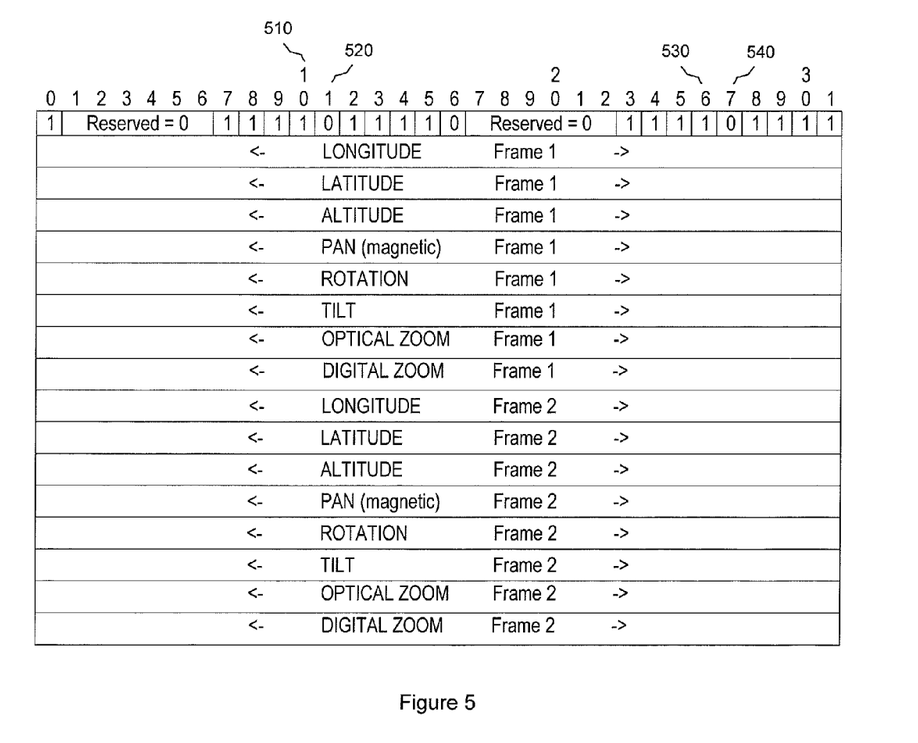
FIG. 5 illustrates another example RTP location/orientation payload, according to an implementation of the disclosure.

A second example is shown in FIG. 5. In this case, all of the parameters defined previously are present and the direction for Pan is determined according to the "magnetic" direction. That is, bit 510 in the first ToC entry and bit 530 in the second ToC entry are both set to "1", indicating that Pan is present in the LO data, while bit 520 in the first ToC entry and bit 540 in the second ToC entry are both set to "0", indicating that the Pan is based on a magnetic direction. All of the other LO-related bits are set to "1", indicating that data elements corresponding to those bits are included in the data portion of the LO payload.

In an embodiment, if the clock rate for the above RTP payload format is sufficiently granular, then a field might be defined for packets with multiple LO frames in order to indicate a time offset between the LO frames. This offset may be present in the payload header, for example between the ToC entries.

For example, if the clock rate for the payload format is 1000 Hz and two LO samples (frames) differ by a tenth of a second, then the time offset would be 100 between the two. If the frames are sent in the same packet in order to reduce overhead, then the time offset field can contain 100. The field could be one or two bytes in length, for example. In this case, in a ToC with more than one entry, each ToC entry would be separated by a time offset field.

Figure 6:
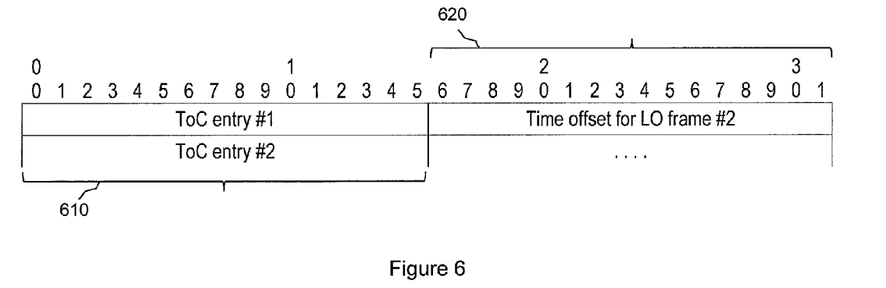
FIG. 6 illustrates an example of a table of contents entry with a time offset, according to an implementation of the disclosure.

For example, if the time offset field were two bytes in length, then the ToC might look as shown in FIG. 6. The first LO frame would be assigned the timestamp in the RTP header. ToC entry #2 610 corresponds to an LO frame with a timestamp equal to the RTP timestamp plus the value of the "Time offset for LO frame #2" field 620.

Figure 7:
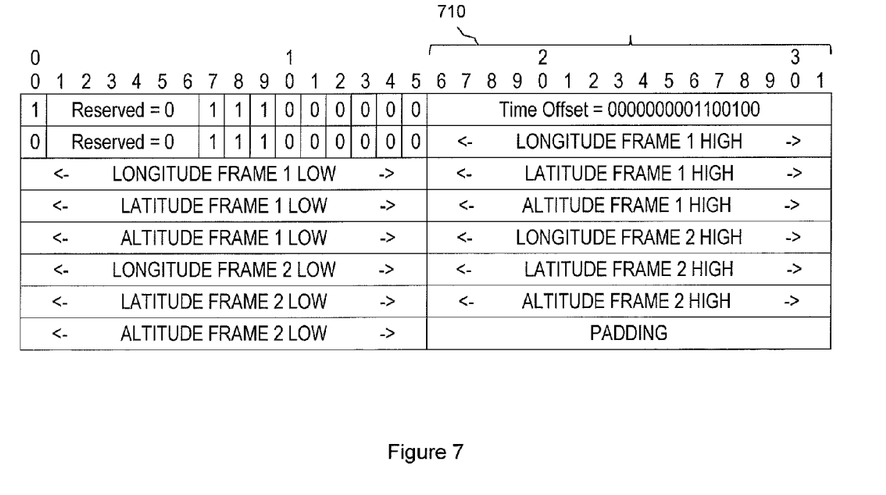
FIG. 7 illustrates an example of two location/orientation frames with a time offset, according to an implementation of the disclosure.

FIG. 7 shows an example of two LO frames (each containing only the location parameters of longitude, latitude, and altitude). The example is similar to that of FIG. 4, except a "Time Offset" field 710 has been added to the payload in FIG. 7. This particular offset (100) would occur, for example, if the clock rate for the payload format was 1000 Hz and the two LO frames correspond to timestamps 0.1 seconds apart.

Although the terms "frame" and "sample" have been used interchangeably above because all LO parameters within a frame had the same timestamp in the above examples, in other embodiments it is also possible for various parameters within a frame to be associated with different timestamps. This could be done with separate timestamps included within the payload or with time offsets included in the payload.

In an embodiment, a first device might specify one or more LO parameters that the first device wishes to receive from a second device. That is, during call setup, a negotiation might occur between two devices such that the first device transmits to the second device a message requesting from the second device one or more elements of LO data associated with the second device. Upon receiving the message, the second device might provide the requested data. In an embodiment, the data request might be made through the use of a Session Description Protocol (SDP) offer message.

The defined media types for an SDP "m=" line are audio, video, text, application, and message. In an embodiment, in the case of the LO RTP payload format, the media type is set to "application". An appropriate "encoding name" and "clock rate" may be defined and registered with the Internet Assigned Numbers Authority (IANA) for the payload format. For example, the "encoding name/clock rate" might be "LO/1000".

A simplified SDP offer for an audio, video, and LO session might look like the following:
  m=audio 45678 RTP/AVP 97
  a=rtpmap:97 AMR/8000/1
  m=video 49154 RTP/AVP 98
  a=rtpmap:98 H264/90000
  m=application 65432 RTP/AVP 99
  a=rtpmap:99 LO/1000

In this case, the offer indicates that the offerer would like to receive audio packets encoded with AMR on port number 45678, video packets encoded with H.264 on port number 49154, and LO packets on port number 65432.

In an embodiment, one or more payload-specific SDP parameters might be included in such an SDP offer to indicate that the offerer is interested only in a particular subset of the LO parameters. For example, the offerer might be interested only in the Rotation parameter. This interest might be indicated by the addition of a "flags" SDP parameter to an SDP offer. The "flags" parameters might be set to a value of "8" to correspond to a binary value of the flags in the order defined previously with only the Rotation-present flag (F4) set. That is, a "flags" parameter of "8" corresponds to a binary value of 1000, which in turn refers to the F4 flag, as the LO flags in the ToC were defined above. In this case, a simplified media level SDP offer might look like the following:

m=audio 45678 RTP/AVP 97
    a=rtpmap:97 AMR/8000/1
    m=video 49154 RTP/AVP 98
    a=rtpmap:98 H264/90000
    m=application 65432 RTP/AVP 99
    a=rtpmap:99 LO/1000
    a=fmtp:99 flags=8

Such an SDP offer indicates that the offerer is interested in receiving only the Rotation parameter. A device receiving such an SDP offer may return an LO payload with the F4 flag in the ToC set to "1" and a value for the rotation of the device in the LO data. Asymmetric operation may be achieved by having separate SDP parameters for sending and receiving, for example "flags_receive" and "flags_send". For example, User1/Device1 may want to receive rotation, latitude, and longitude from User2/Device2, but User2/Device2 may only want to receive rotation from User1/Device1. It may also be the case that one device is only receiving audio, but sending audio and video. In that case the rotation parameter, for example, might not be relevant to the device receiving only audio.

Regarding the second implementation, if relatively few LO parameters are being negotiated, then it may be efficient in terms of overhead to include the LO parameters as an RTP header extension in an existing RTP packet for audio or video. A negotiation of the LO data that is to be sent may occur during call setup in this implementation as described above for the first implementation.

More specifically, as an alternative to having a separate RTP stream for LO data, the LO data may be included in an RTP header extension for one of the other RTP streams—for example, the video RTP stream. It is also possible for the audio and video to come from different sources, each with their own LO parameters. In such cases, LO data may be included in RTP header extensions for both audio and video. The use of LO data in the RTP header extension may also be negotiated with SDP. The SDP may enable the ability to negotiate a subset of the LO data and also for the data to be asymmetric (User1/Device1 receives a different set of parameters in the LO data than User2/Device2) as described above. The session and/or media SDP bandwidth parameters may be adjusted to reflect the expected additional bandwidth due to the header extension. Alternatively, separate SDP bandwidth parameters for the header extension may be defined.

Figure 8:
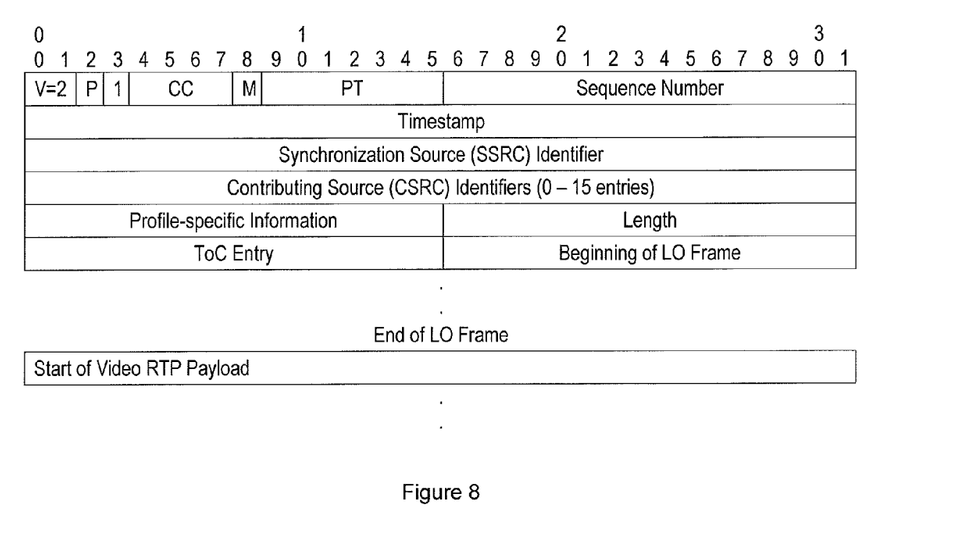
FIG. 8 illustrates an RTP packet format with a header extension, according to an implementation of the disclosure.

In an embodiment, an RTP packet may include LO data by taking the format shown in FIG. 8. All of the fields up to and including the CSRC (if present) are the standard format of any RTP packet. If bit #3 is set to "1" as in FIG. 8, then this indicates that the RTP header is followed by a header extension. In the embodiment of FIG. 8, the header extension contains the LO payload, namely a ToC and LO data. The "Profile-specific Information" field may contain an identifier that identifies this header extension as one containing LO data or even identifying particular LO data. Following the length field may be the Table of Contents (ToC) for the LO parameters in any of the formats defined above, followed by the LO data. In this case, however, the ToC and all of the LO data are only present within the header extension of the RTP packet (in this case a video RTP packet) and are not present within the video payload. The RTP header extension does not need to be included in every RTP packet. It may be sent only when the location and/or orientation of the recording device (e.g., camera, microphone, etc.) changes. The LO data received may be considered valid until a new RTP header extension with new LO data (and hence a new RTP timestamp) is received.

The timestamp of the LO data may be that of the RTP packet itself. Alternatively, a separate timestamp or time offset may be included in the header extension containing the LO data. This may give additional flexibility so that the timing of the LO data is not constrained to be exactly aligned with the audio or video packet sent. Having a separate timestamp may also allow the LO data to have its own timescale, which may be defined separately from audio and video. This may be useful for cases where stored video is being streamed from a file in which the LO data has been recorded in a timed metadata track because this timed metadata track may have its own timescale.

Figure 9:
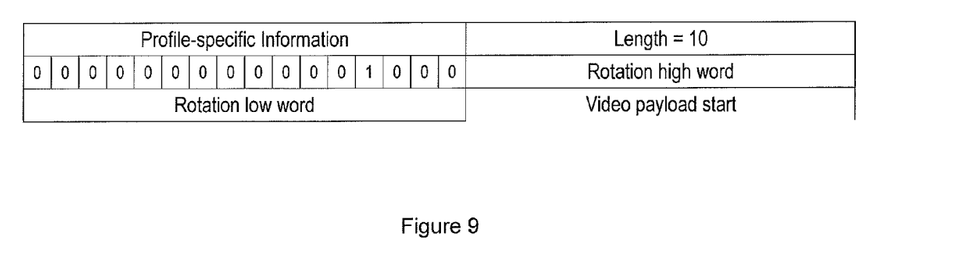
FIG. 9 illustrates a header extension that contains location/orientation data, according to an implementation of the disclosure.

Including the LO data within an RTP header extension may have advantages in terms of overhead if the number of parameters to be included in the header extension is small and if having a separate RTP stream would represent significant overhead. For example, FIG. 9 shows what the header extension might look like if the only LO parameter included is Rotation. The ToC entry has only the F4 bit set, indicating that the only parameter included is Rotation.

Regarding the third implementation, the LO parameters could be included within an RTCP packet that is sent with the RTCP packets for either audio or video. If used with an Audio-Visual Profile with Feedback (AVPF) profile, for example, then any time one or more of the parameters changes (for example, the user rotates the screen), the updated LO data can be sent substantially immediately, as the AVPF allows substantially immediate feedback. Therefore, this implementation has the possibility of being more event driven. A negotiation of the LO data that is to be sent may occur during call setup in this implementation as described above for the first implementation.

Figure 10:
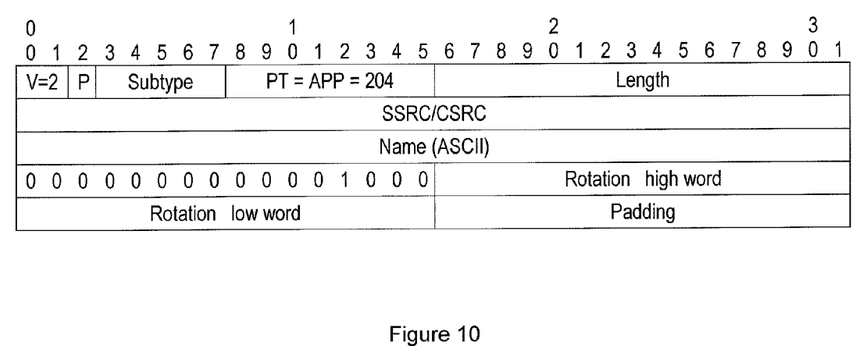
FIG. 10 illustrates a format of an RTCP App packet, according to an implementation of the disclosure.

More specifically, RTP has a companion protocol known as RTCP that can be used for providing feedback for a received stream. In an embodiment, an RTCP packet, in particular an RTCP App packet, may include an LO payload that has the same ToC/LO data format described above. In this implementation, the LO data may be associated with either RTCP audio packets or RTCP video packets. It is also possible that the audio and video could come from different sources, each with their own LO parameters, and that LO data could be associated with the RTCP packets of both audio and video. In an embodiment, the RTCP App packet may have the format shown in FIG. 10. In this case, the Subtype and the Name might identify the App packet as containing LO data having one of the formats defined above. The RTCP App packet may be sent only when the recording device (e.g., a camera or a microphone) changes its location and/or orientation. The RTCP App packet may be piggybacked with other RTCP data. The LO data may be considered valid until a new RTCP packet containing new LO data is received. If, as in the previous example for the RTP header extension, the only parameter included is Rotation, then the App packet may have the form shown in FIG. 10.

The RTCP App packets containing the LO data may be sent together with an RTCP sender report packet, so that the LO data may be assigned the timestamp of the RTCP sender report packet. Alternatively, a separate timestamp or time offset may be included in the RTCP App packet for the LO data. Having a separate timestamp may allow the LO data to have its own timescale, which may be defined separately from audio and video. This may be especially useful in cases where stored video is being streamed from a file in which LO data has been recorded in a timed metadata track because the timed metadata track may have its own timescale. If the RTCP App packet is allowed to be sent separately from an RTCP Sender Report, it may also include a network time protocol (NTP) timestamp so that the RTP timestamp can be related to wallclock time. The use of an RTCP App Packet for sending LO data may be negotiated with SDP. The SDP may enable the ability to negotiate a subset of the LO data and also for the data to be asymmetric (User1/Device1 receives a different set of parameters in the LO data than User2/Device2) as described above.

Figure 11:
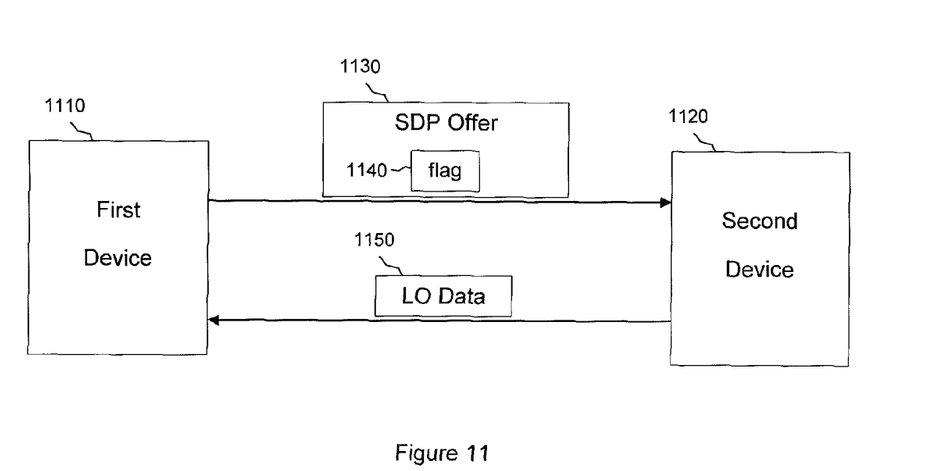
FIG. 11 illustrates a negotiation of an exchange of location/orientation data between two devices, according to an embodiment of the disclosure.

FIG. 11 illustrates an embodiment of a negotiation of an exchange of LO data. A first device 1110 sends a message 1130 to a second device 1120. In an embodiment, the message 1130 is an SDP offer that contains a flag 1140 that indicates one or more elements of LO data associated with the second device 1120 that the first device 1110 would like to receive from the second device 1120. After receiving the message 1130, the second device 1120 may send the requested LO data 1150 to the first device. In an embodiment, the message 1130 and the LO data 1150 may be transmitted via RTP or some other protocol that, like RTP, allows real-time data transfer directly between the devices without the data passing through any intermediary devices. Such a transmission may be contrasted with a transmission via Session Initiation Protocol (SIP) or hypertext transmission protocol (http), where data is not necessarily transmitted in real time and may pass through one or more intermediary devices.

Figure 12:
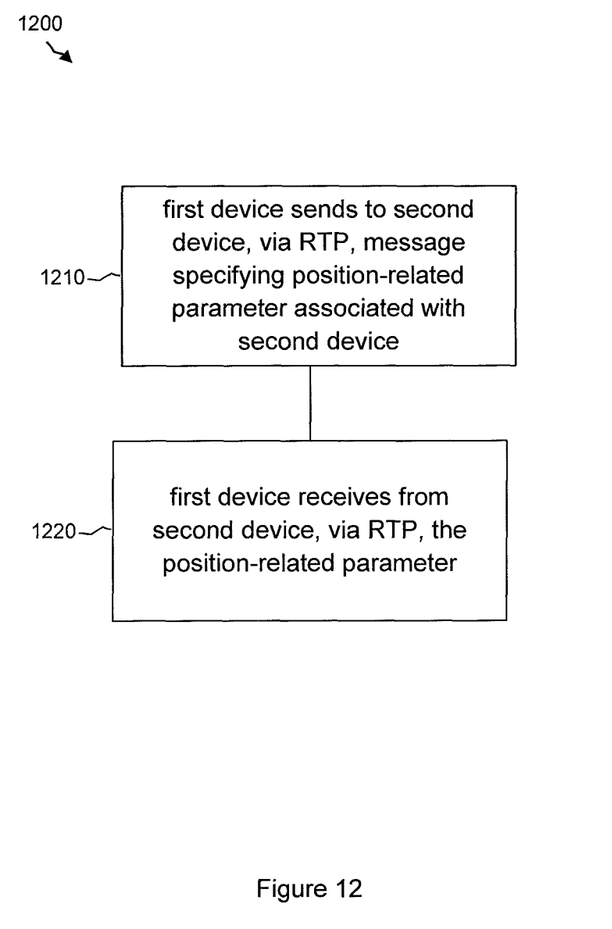
FIG. 12 is a flowchart for a method for providing location/orientation data, according to an implementation of the disclosure.

FIG. 12 illustrates an implementation of a method 1200 for providing position information, which may include location information and/or orientation information. At box 1210, a first device sends to a second device, via a real-time transmission protocol, a message specifying at least one position-related parameter associated with the second device. At box 1220, the first device receives from the second device, via the real-time transmission protocol, the at least one position-related parameter.

Figure 13:
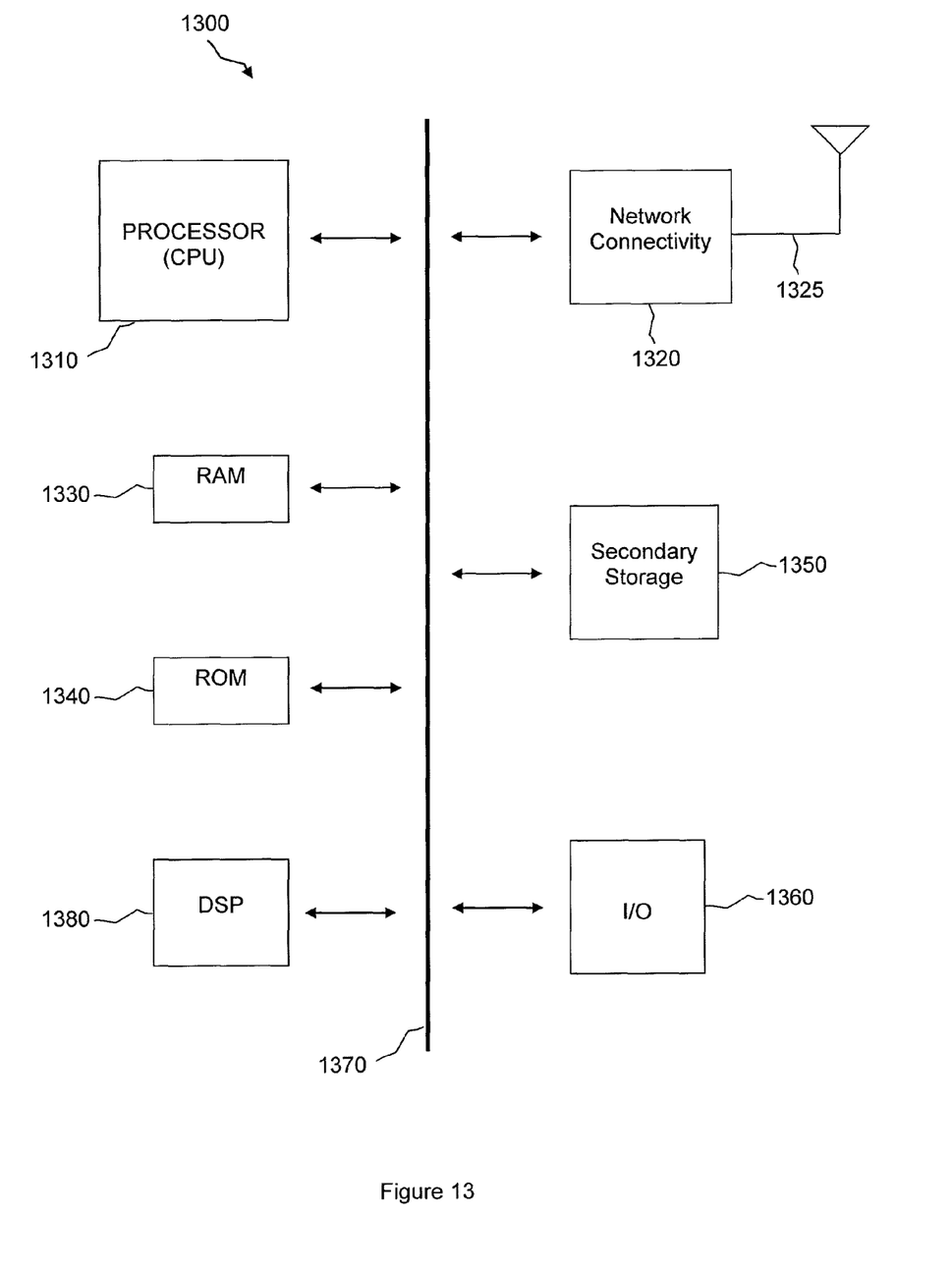
FIG. 13 illustrates a processor and related components suitable for implementing the present disclosure.

The devices described above might include a processing component that is capable of executing instructions related to the actions described above. FIG. 13 illustrates an example of a device 1300 that includes a processing component 1310 suitable for one or more of the implementations disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, digital subscriber line (xDSL) devices, data over cable service interface specification (DOCSIS) modems, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an implementation, a method is provided for providing position information. The method comprises sending, by a first device to a second device, via a real-time transmission protocol, a message specifying at least one position-related parameter associated with the second device. The method further comprises receiving, by the first device from the second device, via the real-time transmission protocol, the at least one position-related parameter.

In another implementation, a device is provided. The device comprises a processor configured such that the device sends to another device, via a real-time transmission protocol, a message specifying at least one position-related parameter associated with the other device. The processor is further configured such that the device receives from the second device, via the real-time transmission protocol, the at least one position-related parameter.

In another implementation, a method is provided for providing position information. The method comprises sending, by a first device to a second device, via RTP, at least one position-related parameter associated with the first device. The at least one position-related parameter is transmitted in at least one of an RTP stream separate from an RTP video stream and separate from an RTP audio stream, a header extension of at least one of an RTP video stream or an RTP audio stream, or an RTCP feedback packet.

The following are incorporated herein by reference for all purposes: 3GPP Technical Specification (TS) 26.244, IETF RFC 3550, IETF RFC 4585, and IETF RFC 4566.

While several implementations have been provided in the present disclosure, it should be understood that the disclosed systems and methods may be implemented in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for providing position information, the method comprising:
    sending, by a first device to a second device, via the Real-time Transport Protocol (RTP) specified in Internet Engineering Task Force (IETF) Request for Comments (RFC) 3550, a request for at least one position-related parameter of the second device, wherein the at least one position-related parameter determines a geographic location and/or a physical orientation of the second device; and
    receiving, by the first device from the second device, via the RTP specified in IETF RFC 3550, the at least one position-related parameter in a payload comprising a table of contents portion comprising a plurality of binary flags and at least one geographic location and/or physical orientation portion responsive to the request.

2. The method of claim 1, wherein the at least one position-related parameter is received in an RTP stream separate from an RTP video stream and separate from an RTP audio stream.

3. The method of claim 1, wherein the at least one position-related parameter is received in a header extension of at least one of an RTP video stream or an RTP audio stream.

4. The method of claim 1, wherein the at least one position-related parameter is received in an RTP Control Protocol (RTCP) feedback packet.

5. The method of claim 1, wherein the at least one position-related parameter is specified in a Session Description Protocol (SDP) offer message.

6. The method of claim 1, wherein the at least one position-related parameter is at least one of:
    longitude;
    latitude;
    altitude;
    pan;
    pan direction;
    rotation;
    tilt;
    optical zoom; or
    digital zoom.

7. The method of claim 1, wherein the at least one position-related parameter is delivered in a multimedia telephony session.

8. The method of claim 1, wherein the settings of the flags indicate the presence or absence of corresponding data elements in a data portion of the payload.

9. The method of claim 1, wherein a plurality of position-related parameters are separated by time offset values such that the position-related parameters are received at intervals longer than intervals at which video data or audio data is received.

10. A device, comprising:
    a memory; and
    a central processor unit (CPU) configured such that the device sends to a second device, via the Real-time Transport Protocol (RTP) specified in Internet Engineering Task Force (IETF) Request for Comments (RFC) 3550, a request for at least one position-related parameter of the second device, wherein the at least one position-related parameter determines a geographic location and/or a physical orientation of the second device, the processor further configured such that the device receives from the second device, via the RTP specified in IETF RFC 3550, the at least one position-related parameter in a payload comprising a table of contents portion comprising a plurality of binary flags and at least one geographic location and/or physical orientation portion responsive to the request.

11. The method of claim 10, wherein the at least one position-related parameter is received in an RTP stream separate from an RTP video stream and separate from an RTP audio stream.

12. The method of claim 10, wherein the at least one position-related parameter is received in a header extension of at least one of an RTP video stream or an RTP audio stream.

13. The method of claim 10, wherein the at least one position-related parameter is received in an RTP Control Protocol (RTCP) feedback packet.

14. The device of claim 10, wherein the at least one position-related parameter is specified in a Session Description Protocol (SDP) offer message.

15. The device of claim 10, wherein the at least one position-related parameter is at least one of:
longitude;
latitude;
altitude;
pan;
pan direction;
rotation;
tilt;
optical zoom; or
digital zoom.

16. The device of claim 10, wherein the at least one position-related parameter is delivered in a multimedia telephony session.

17. The device of claim 10, wherein the settings of the flags indicate the presence or absence of corresponding data elements in a data portion of the payload.

18. The device of claim 10, wherein a plurality of position-related parameters are separated by time offset values such that the position-related parameters are received at intervals longer than intervals at which video data or audio data is received.

19. A method for providing position information, the method comprising:
receiving, by a first device from a second device, via the Real-time Transport Protocol (RTP) specified in Internet Engineering Task Force (IETF) Request for Comments (RFC) 3550, a request for at least one position-related parameter of the first device wherein the at least one position-related parameter determines a geographic location and/or a physical orientation of the first device,
sending, by the first device to the second device, via the RTP specified in IETF RFC 3550, the at least one position-related parameter in a payload comprising a table of contents portion comprising a plurality of binary flags and at least one geographic location and/or physical orientation portion.

20. The method of claim 19, wherein the at least one position-related parameter is specified in a Session Description Protocol (SDP) offer message sent to the first device from the second device.

21. The method of claim 19, wherein the at least one position-related parameter is at least one of:
longitude;
latitude;
altitude;
pan;
pan direction;
rotation;
tilt;
optical zoom; or
digital zoom.

22. The method of claim 19, wherein the at least one position-related parameter is delivered in a multimedia telephony session.

23. The method of claim 19, wherein the settings of the flags indicate the presence or absence of corresponding data elements in a data portion of the payload.

24. The method of claim 19, wherein a plurality of position-related parameters are separated by time offset values such that the position-related parameters are received at intervals longer than intervals at which video data or audio data is received.

* * * * *